Oct. 26, 1926.

P. URTFJELD ET AL 1,604,668

ANTICLOGGING ATTACHMENT FOR DISK HARROWS

Filed August 10, 1923

INVENTORS
PEDER URTFJELD.
ALBERT AUSTIN.
BY THEIR ATTORNEY.

James F. Williamson

Patented Oct. 26, 1926.

1,604,668

UNITED STATES PATENT OFFICE.

PEDER URTFJELD AND ALBERT AUSTIN, OF BERTHOLD, NORTH DAKOTA.

ANTICLOGGING ATTACHMENT FOR DISK HARROWS.

Application filed August 10, 1923. Serial No. 656,712.

This invention relates to a disk harrow and particularly to an anti-clogging or cleaning device therefor. Disk harrows which usually comprise a supporting shaft having thereon a plurality of spaced disks are now very generally used. When used in wet, moist or sticky ground the disks tend to pick up the earth and to clog badly about the shaft. This clogging has resulted in quite general use of scrapers which usually comprise a blade disposed with its edge against the disk to scrape the earth therefrom. In spite of the use of these scrapers, however, a great deal of the earth and other material accumulates about the axle or shaft in between the disks especially when the harrow is used in ground which is quite moist.

It is an object of this invention, therefore, to provide a very simple and efficient device for preventing the accumulation of dirt between the disks and for keeping the shaft in clean condition.

It is a further object of the invention to provide such a device comprising a rod-like member having a loop therein disposed over the shaft.

It is another object of the invention to support such rod or rods from a member disposed above and at the rear of said disks, which member preferably is adjustable.

It is more specifically an object of the invention to provide a cleaning device comprising a rod supported at a point above and at the rear of said disks and having diverging arms extending downwardly and forwardly with loops formed at their ends, which loops embrace the shaft of the harrow between the pairs of disks thereon, said rod being flexibly supported.

These and other objects and advantages of the invention will be fully set forth in the following description made in connection with the accompanying drawings in which like reference characters refer to the same parts throughout the different views, and in which—

Figure 1:
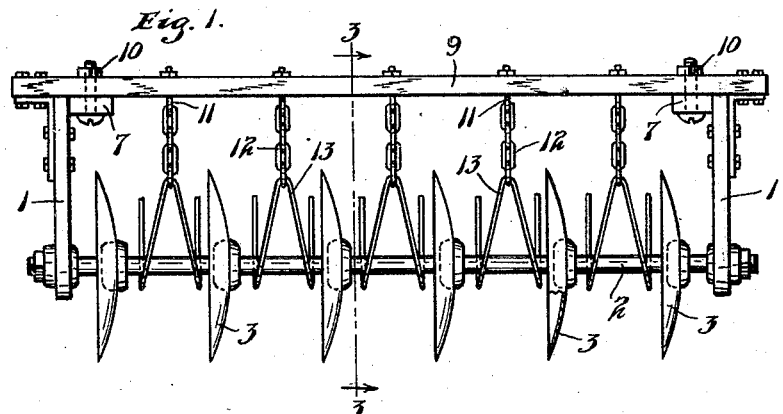
Fig. 1 is a view in rear elevation of a disk harrow showing the invention applied thereto.
Figure 2:
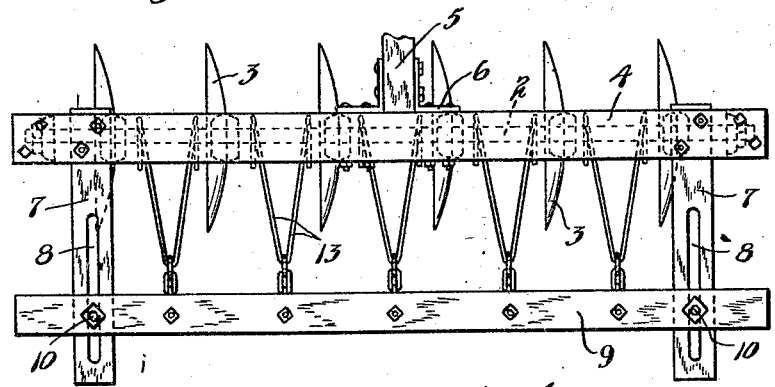
Fig. 2 is a top plan view of the device shown in Fig. 1.
Figure 3:
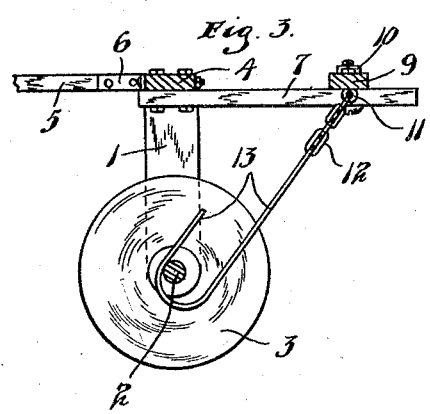
Fig. 3 is a vertical section taken on the line 3—3 of Fig. 1, as indicated by the arrows.

Referring to the drawings, a disk harrow or section of a disk harrow is illustrated, comprising substantially vertical frame members 1 in which are journaled and supported the shaft 2 carrying thereon the spaced disks 3. It will be understood that the invention is applicable to any type of disk harrow, the harrow illustrated being more or less diagrammatically shown and illustrative of any type of harrow comprising the spaced disks. In the embodiment of the invention illustrated, the frame members 1 are indicated by a top cross member 4 which will have connected thereto some draft means of any suitable form, which is illustrated as a tongue 5 secured by suitable angle brackets 6 bolted thereto and to the frame member 4. The frame member 4 supports a pair of rearwardly projecting arms 7 provided with longitudinally extending slots 8. A transverse member or bar 9 is supported upon the members 7 and provided with headed and nutted bolts 10 projecting therethrough and through the slots 8 by means of which the bar 9 can be secured in various positions along the members 7. The bar 9 has secured therein and depending from its underside a plurality of spaced eye-bolts 11, each of which supports a short section of chain 12. A rod 13 is supported in each one of the chains 12 in the lowermost link thereof and is bent to comprise diverging arms which extend downwardly and forwardly and have their ends bent to extend substantially parallel to the main portion thereof, thus forming open-ended loops, which loops embrace and are supported upon the shaft 2, as clearly shown in Fig. 3.

As the harrow is drawn through the ground, any dirt or other material which may be picked up by the disks and carried forwardly will encounter the rear sides of the rods 13 and will thus be prevented from passing to the top of the shaft 2, said material merely dropping back to the ground. The rods 13 being loosely supported on the shaft 2 will be given more or less of a vibrating or jiggling motion by the travel of the harrow and will thus effectively act to keep the shaft 2 clean and prevent the clogging of dirt thereon between the disks.

Figure 4:
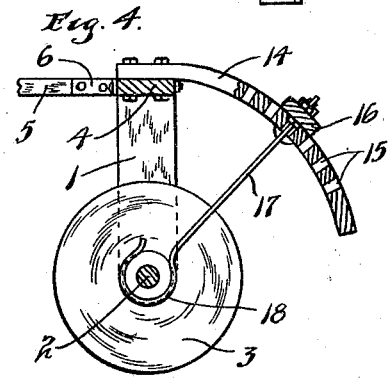
Fig. 4 is a view similar to Fig. 3, showing a modified form of the invention.

In the modification illustrated in Fig. 4, rearwardly and downwardly curved members 14 are used supported on top of the frame member 4, which members are provided with a plurality of apertures 15. A transverse member 16 is supported on top of the members 14 and adapted to be secured thereon in various positions by headed and nutted bolts passing therethrough and through the holes 15. Said bar 16 carries a plurality of rods 17 having their upper ends passing therethrough and threaded and being provided with nuts at each side of the bar 16. Said rods 17 extend downwardly and forwardly and are formed at their lower ends with open substantially circular loops 18 which are disposed about the shaft 2 of the harrow. One or more of the rods 17 can be used between each pair of disks 3.

The operation of the structure shown in Fig. 4 is substantially like that of the structure shown in the other figures. Any earth or other material carried upwardly by the rear sides of the disk will strike against the rods 17 and thus be prevented from piling up between the disks. The rods 17 will have some resiliency and as their lower ends or the loops 18 loosely embrace the shaft, will be given more or less vibration by the motion of the harrow. The shaft 2 and the space between the disks will thus be kept free and clean.

From the above description it is seen that applicant has provided an extremely simple and efficient cleaning device for a harrow. The same can be readily applied to practically all types of standard disk harrows and can be applied at small expense and little trouble. The device has been amply and successfully demonstrated in actual practice. It has been shown that with the use of the invention, the farmer can get into his field a great deal sooner than if the device is not used and thus does not have to wait until the ground is dry in order to use the harrow. This is a great advantage as the time is often short in which the ground can be prepared and the seeding accomplished in proper season.

It will, of course, be understood that various changes may be made in the form, details, proportion and arrangement of the parts without departing from the scope of applicant's invention, which, generally stated, consists in a device capable of carrying out the objects above stated, such as shown and described and set forth in the appended claims.

What is claimed is:

1. The combination with the shaft of a disk harrow having spaced disks thereon, of a suspending member situated over said disks, a plurality of flexible means swingingly depending from said member, and a plurality of laterally bifurcated hooked cleaner members carried by said flexible means and embracing said shaft between said disks.

2. The combination with the frame of a disk harrow, a shaft supported in said frame, and spaced disks supported on said shaft, of a member supported by said frame above and at the rear of said disks, swinging flexible means connected to said member, a cleaning device comprising spaced rods supported by said means and extending downwardly between two of said disks, said rods having open loops formed at their lower ends embracing said shaft.

3. The combination with the frame of a disk harrow, a shaft supported in said frame, and spaced disks supported on said shaft, of a member adjustably supported on said frame above and at the rear of said disks, flexible means depending from said member, and a rod supported by said means having downwardly and forwardly extending diverging arms having open loops at their ends embracing and supported by said shaft.

4. The combination with the frame of a disk harrow, a shaft supported in said frame, spaced disks supported on said shaft, of spaced members extending rearwardly from said frame above and at the rear of said disks, a transverse member supported by said member and extending substantially parallel to said shaft, means for securing said transverse member in a plurality of positions, spaced flexible means depending from said transverse member, each supporting downwardly extending diverging rods having their lower ends bent substantially parallel thereto forming open loops, said loops being disposed about said shaft between the pairs of said disks.

5. The combination with the shaft of a disk harrow having spaced disks thereon of a suspending member situated above and at the rear of said disks, a plurality of hooked cleaner members carried by said suspending member and embracing said shaft between said disks; said suspending member being adjustable rearwardly of said shaft to vary the angle of inclination of said cleaner members with said shaft.

6. The combination with the shaft of a disk harrow having spaced disks thereon of a suspending member situated over said disks, a plurality of resilient means depending from said member, a plurality of hooked cleaner members carried by said resilient means and embracing said shaft between said disks, and means for adjusting said first mentioned means and said cleaner members at various inclined angles with said shaft.

In testimony whereof we affix our signatures.

PEDER URTFJELD.
ALBERT AUSTIN.